Figure 1:
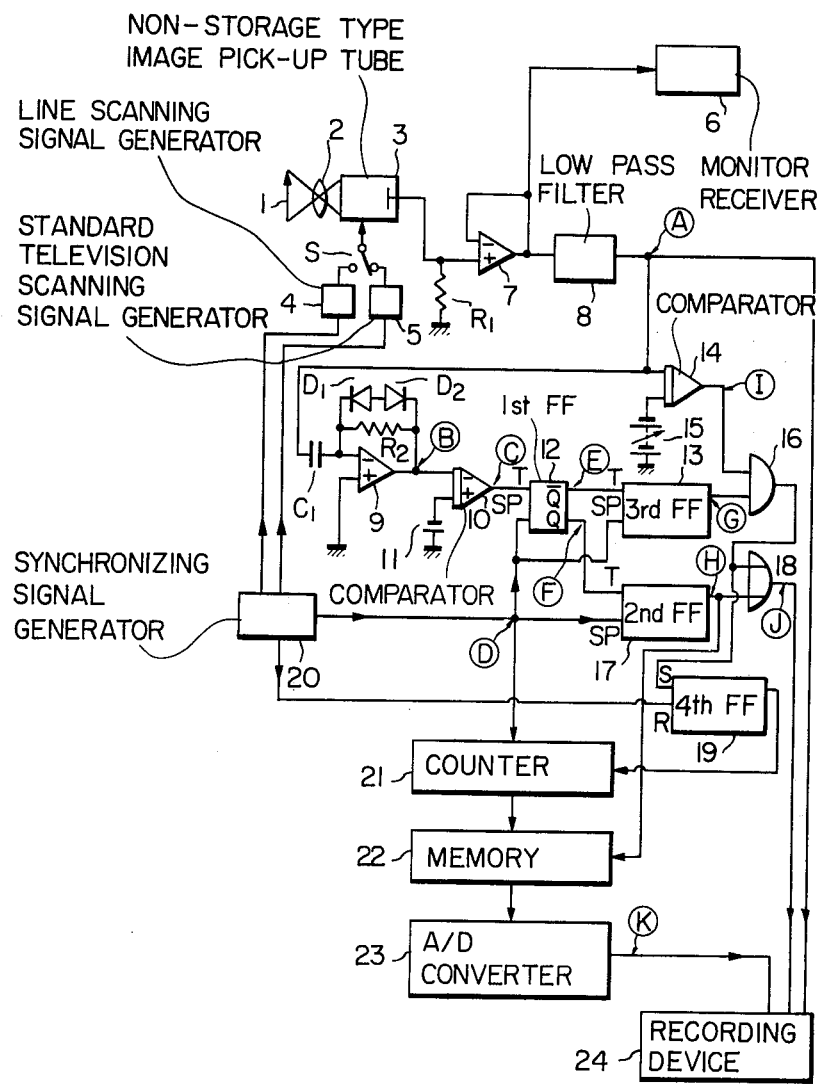

United States Patent [19]

Enami et al.

[11] 3,967,903

[45] July 6, 1976

[54] PHOTODENSITOMETER FOR MEASURING OPTICAL FRINGE PATTERNS

[75] Inventors: Toyoichiro Enami, Tokyo; Kazuo Kurasawa; Masaktaka Ii, both of Hamamatsu; Masaru Hashimoto, Fujisawa, all of Japan

[73] Assignee: Nissan Motor Co., Ltd., Japan

[22] Filed: Nov. 18, 1974

[21] Appl. No.: 524,808

[30] Foreign Application Priority Data

Nov. 22, 1973  Japan.............................. 48-130729

[52] U.S. Cl.............................. 356/167; 356/106 R
[51] Int. Cl.².......................................... G01B 11/00
[58] Field of Search ........... 356/106, 167, 107, 111, 356/113; 178/6.8

[56] References Cited
UNITED STATES PATENTS

| | | |
|---|---|---|
| 3,527,537 | 9/1970 | Hobrough ......................... 356/106 |
| 3,549,870 | 12/1970 | Lay .................................. 356/106 |
| 3,644,046 | 2/1972 | Ryan ................................. 178/6.8 |
| 3,661,464 | 5/1972 | Hubbard ........................... 356/106 |
| 3,771,875 | 11/1973 | Russo ............................... 356/113 |

*Primary Examiner*—Alfred E. Smith
*Assistant Examiner*—D. C. Nelms
*Attorney, Agent, or Firm*—Robert E. Burns; Emmanuel J. Lobato; Bruce L. Adams

[57] ABSTRACT

A non-storage type image pick-up tube line scans a sample for picking up the fringes. A circuit responds to the maximum and minimum values of the output from the image pick-up tube generating a signal corresponding to the brightness of the fringes, signals corresponding to the positions of the bright and/or dark spots of the fringes, and signals corresponding to the spacings between a reference point and the positions of the bright and/or dark spots of the fringes.

8 Claims, 2 Drawing Figures

PHOTODENSITOMETER FOR MEASURING OPTICAL FRINGE PATTERNS

This invention relates generally to a photodensitometer and more particularly to a photodensitometer of the type wherein a sample surface is electrically scanned by a non-storage type image pick-up tube.

In recent years, a method termed "optical dynamics" has been experimentally widely used in which a diffused fringe pattern corresponding to the condition inside an object is formed by optical means and the pattern is observed for experimentally analyzing the stress or strain acting on the object. Such optical dynamics include a photo-elastic process, moire process, light interference process and holography process. According to each of these processes, the stress or strain acting on an object is determined by analyzing the informations regarding the intensity and density of the fringes. For this reason, the accuracy of the measurement is determined essentially by the accuracy of reading the positions of the fringes.

Heretofore, the measurement of the fringes has been made mainly by using a photo-electric multiplier tube in which the pattern of the fringes appearing on a sample is focused on a screen by means of an optical device, the light transmitted through a pin hole or a slit mounted on the screen is converted into a photoelectric current by the photo-electric multiplier tube and the photo-electric current is amplified by a DC amplifier for reading the intensity of light with an ammeter or a recording meter. When the pin hole is fixed on the casing of the photo-electric multiplier tube so as to scan the sample in the vertical and horizontal directions together with the photo-electric multiplier tube it is possible to continuously determine the distribution of the light intensity. With this method however, it is impossible to convert the light into the photo-electric current unless the intensity of the light (brightness of the fringes) is higher than a predetermined value. Moreover, as mechanical scanning is relied upon, high speed measurement is not possible. Thus, the field of application of such method is limited. Accordingly, it has been impossible to measure directly the intensity of light with a diffused light elastic process or holography process where the intensity of the fringes is low. In such cases it is required to form negative films by exposing the films for a long time for measuring the blackness of the samples.

As has been described hereinabove the prior art methods require a long time and complicated process steps for reading the positions of the fringes so that an improved method capable of rapidly reading and analyzing is highly desired.

Accordingly, it is an object of this invention to provide an improved photodensitometer capable of accurately measuring the distribution of the light intensities of the fringes as well as the spacing between the fringes in an extremely short time.

Another object of this invention is to provide an improved photodensitometer capable of varying the field as desired so that samples of any size can be accurately measured.

Still another object of this invention is to provide an improved photodensitometer with a monitor receiver enabling ready adjustment of the field as well as rapid focusing of the lens system thereby simplifying the process steps of measurement.

According to this invention, these and further objects can be accomplished by providing a photodensitometer comprising a non-storage type image pick-up tube for picking up the light fringes formed on the surface of a sample, means for line scanning the image by the tube, means responsive to the output from the non-storage type image pick-up tube for producing a pulse each time the output reaches a maximum and/or minimum value, and a circuit for producing an output corresponding to an interval between a reference instant and an instant at which the pulse is produced, thereby forming a signal corresponding to the brightness of the fringes of the surface of the sample, signals corresponding to the positions of the bright and/or dark spots of the fringes, and signals corresponding to the spacings between a reference point and the positions of the bright and/or dark spots of the fringes.

There is also provided a monitor receiver for displaying the output of the non-storage type image pick-up tube on a screen. The screen of the monitor receiver is provided with a line scanning indicator for setting the position of line scanning.

Figure 2:
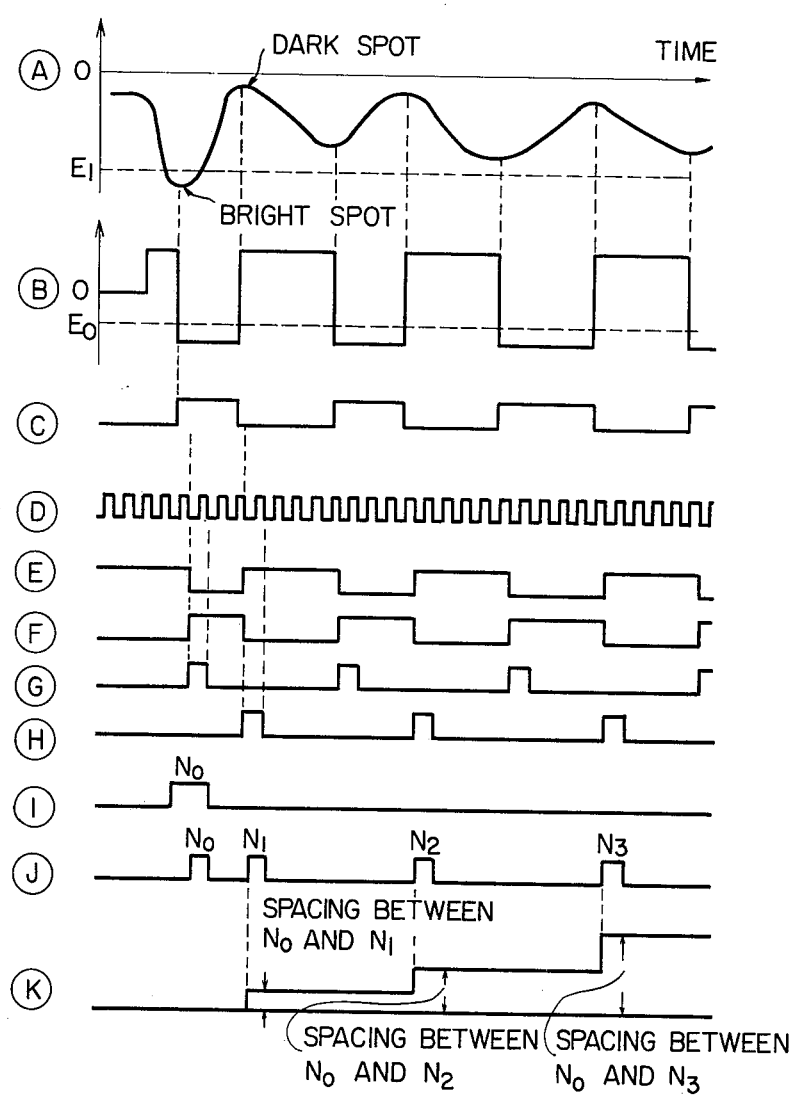

Further objects and advantages of the invention can be fully understood from the following detailed description taken in conjunction with the accompanying drawings in which:

FIG. 1 is a block diagram of a preferred embodiment of a photodensitometer circuit according to this invention; and FIG. 2 shows waveforms of signals at various portions of the circuit shown in FIG. 1.

A preferred embodiment of the novel photodensitometer circuit of this invention illustrated in FIG. 1 for analyzing a sample 1, comprises an objective lens 2, a non-storage type image pick-up tube 3 arranged to receive the light transmitted through the lens 2, a line scanning signal generator 4, a standard television scanning signal generator 5 and a transfer switch S for selectively connecting the signal generators 4 and 5 to the image pick-up tube 3. There are also provided a monitor receiver 6 connected to the output of the pick-up tube through an amplifier 7, a low pass filter 8 connected to the output of amplifier 7, a second amplifier 9 connected to the output of the low pass filter 8 through a capacitor $C_1$ and a comparator 10 connected to compare the output from the amplifier 9 with a voltage $E_o$ of a source of constant DC voltage 11. A plurality of first, second, third and fourth flip-flops 12, 17, 13 and 19 are connected as shown. The output from the low pass filter 8 is compared with the voltage of a source of variable DC voltage 15 by a comparator 14. The output thereof is applied to one input of an AND gate 16, the other input thereof being connected to receive the output of the flip-flop 13. The output of the AND gate 16 is supplied to one input of an OR gate 18 and to one input of the flip-flop 19. A synchronizing signal generator 20 is provided for supplying a synchronizing signal or clock pulse to the scanning signal generators 4 and 5, to one input of each flip-flops 17 and 19 and to one input of a (12 bit) counter 21 which is also connected to receive the output of the flip-flop 19. The output from the counter 21 is applied to a recording device 24 through a memory device 22 and an analogue-digital converter 23. The memory device 22 is controlled by the output of the flip-flop 17, and the recording device 24 is also connected to receive the outputs from the low pass filter 8 and the OR gate 18. Two diodes $D_1$ and $D_2$ connected in series opposition and a resistor $R_2$ are connected in parallel across the input and output of the amplifier 9. The main input of amplifier 7 is grounded through a resistor $R_1$.

Signal waveforms at various junctions and lines A through K of FIG. 1 are shown in FIG. 2 by the same reference symbols. The operation of the circuit shown in FIG. 1 will now be described with reference to FIGS. 1 and 2.

When the switch S is thrown to the standard television scanning signal generator 5, the non-storage type image pick-up tube 3 will be scanned with the standard television scanning signal and its output is sent to the monitor receiver 6 via amplifier 7, thus displaying the fringes appearing on sample 1 on the screen of the monitor receiver 6. While observing the displayed fringes, the observer selects a particular measuring point and aligns this measuring point with a scanning line indicator (not shown) provided for the screen of the monitor receiver. Thereafter the observer throws the transfer switch S to the line scanning signal generator 4 to line scan the non-storage type image pick-up tube 3.

Then the pick-up tube 3 produces an electric signal corresponding to the brightness of the fringes. After being amplified by amplifier 7, the electric signal is passed through the low pass filter 8 to improve its signal to noise radio, whereby an image signal A shown in FIG. 2 appears on the output of the low pass filter 8. This image signal A is sent to the recording device 24 and to the input of amplifier 9 via capacitor $C_1$. Amplifier 9 constitutes a differentiating circuit together with capacitor $C_1$ and resistor $R_2$, whereas diodes $D_1$ and $D_2$ constitute a clipping circuit. Accordingly, the image signal A is differentiated and clipped to form a rectangular wave B as shown in FIG. 2. This rectangular wave B is compared with a constant voltage $E_o$ supplied by the source 11 by comparator 10 to produce a square wave C as shown in FIG. 2. The build-up portions of the square wave C correspond to the brightest portions (hereinafter called the bright spots) of the fringes whereas the descending portions correspond to the darkest portions (hereinafter called the dark spots) of the fringes.

The first flip-flop 12 functions to synchronize the square wave C with the clock pulse D generated by the synchronizing signal generator 20 and produces outputs on its output terminals Q and $\bar{Q}$ at the descending portions of the clock pulse D. The output pulse E from output terminal $\bar{Q}$ and the output pulse F from the output terminal Q have opposite phases so that the output pulse E descends at the build-up portions of the square wave C and the output pulse F descends at the descent portions of the square wave C. The third flip-flop 13 is connected to be set at the descent portions of the output pulse E and reset at the descent portions of the clock pulse D. The flip-flop 17 is connected to be set at the descent portions of the output pulse F and set at the descent portions of the clock pulse D. As a result, flip-flop 13 produces a 1 pulse at each build-up portion of the square wave C, whereas the second flip-flop 17 produces a pulse at each descent portion of the rectangular wave C. FIG. 2 shows the outputs of the flip-flops 13 and 17, respectively.

The image signal A is also sent to the comparator 14 to be compared with a variable DC voltage $E_1$ supplied by the source 15. Generally, the optical dynamic fringes contain brightest portions at the end of the sample so that the value of the variable DC voltage $E_1$ is adjusted such that the comparator 14 produces an output at said brightest portion. Then, at the bright spot at the end of the sample, the output from the comparator 14 and the output from the flip-flop 13 are applied to the inputs of the AND gate 16, thereby enabling the same. The output from the AND gate 16 and the output from the flip-flop 17 are applied to the inputs of the OR gate 18. Accordingly, the output from this OR gate, that is the position signal J shown in FIG. 2 comprises the clock pulse produced at the bright spot at the end of the sample and at the dark spots at other positions. Thus, in FIG. 2, $N_o$ shows a pulse corresponding to the bright spot at the end of the sample whereas $N_1$, $N_2$ and $N_3$ show pulses corresponding to the dark spots. This position signal J is also recorded on the recording device 24.

The output from the AND gate 16 is also applied to one input of the fourth flip-flop 19 thereby setting the same when the pulse $N_o$ of the position signal J is produced. When set, the flip-flop 19 sends an output to counter 21 to commence counting the clock pulses D, and each time the flip-flop 17 produces an output corresponding to the position of each dark spot, the content of the counter 21 is stored in the memory device 22. The content of the memory device 22 is converted into an analogue signal K by the action of the digital-analogue converter 23. The analogue signal K is a space signal representing spacings between pulse $N_o$ and respective pulses $N_1$, $N_2$ - - - . This space signal K is also recorded on the recording device 24.

Upon termination of the line scanning operation, a scanning termination signal is sent to the flip-flop 19 from the synchronizing signal generator 20 thus resetting the flip-flop 19. As a result, counter 21 stops its counting operation.

While in the foregoing description of the preferred embodiment, the position of the dark spot was detected for the purpose of measuring optical dynamic fringes it is also possible to detect the position of the bright spot by utilizing the output from the flip-flop 13. For this reason, the novel photodensitometer of this invention can also be used in other optical measuring applications.

As has been described hereinabove, according to this invention as the scanning and measuring are performed purely electronically it is possible to provide a photodensitometer having high accuracy and reliability and which is easy to maintain. Furthermore, since it is possible to vary the field by the adjustment of the lens system, there is no limit on the size of the sample. The monitor receiver enables the adjustment of the field and focusing of the lens system so that the process steps of the measurement can be greatly simplified. Moreover, it is possible to produce in a short time the image signal, position signal and the space signal regarding the fringe pattern of light.

What is claimed is:
1. A photodensitometer comprising:
   an image pick-up tube of the non-storage type for receiving light rays from fringes formed on a sample:
   first scanning means for energizing said image pick-up tube so that said image pick-up tube scans said sample along a scan line and produces an image signal representing brightness of the fringes lying on the scan line;
   pulse generating means responsive to said image signal for producing a position pulse at each of the maximum and minimum values of said image signal; and circuit means for producing an output signal corresponding to an interval from the beginning of scanning along the scan line to a moment when each position pulse appears, whereby said output signal represents a spacing from the beginning point of the scan line to each of the position pulses.

2. A photodensitometer according to claim 1, which further comprises second scanning means for energizing said image pick-up tube so that said tube scans said sample along a scan line selectable by an operator, switch means for selectively connecting said first and second scanning means to said image pick-up tube, a monitor display tube for displaying said image signal on its screen, and scan line selecting means for selectively determining the scan line scanned by said image pick-up tube.

3. A photodensitometer according to claim 2, in which said scan line selecting means includes a scan line selector associated with said monitor display tube, and means for adjusting the bias deflection voltage to said image pick-up tube for controlling said image pick-up tube to scan the selected scan line.

4. A photodensitometer according to claim 1, which further comprises a low pass filter connected to the output of said image pick-up tube for removing ripple components from said image signal.

5. A photodensitometer according to claim 1, in which said pulse generating means includes a differentiator for differentiating said image signal, a clipper for clipping the differentiated image signal, a comparator for selectively passing therethrough both negative and positive components of the differentiated and clipped image signal, a synchronizing pulse generator for generating synchronizing pulses and a blanking signal, a first flip-flop circuit triggered by the differentiated and clipped image signal when it receives one of said synchronizing pulses, and a second flip-flop circuit triggered to change its state by one of the outputs from said first flip-flop circuit when said second flip-flop circuit receives through its set pedestal terminal one of said synchronizing pulses.

6. A photodensitometer according to claim 5, in which said circuit means includes a comparator connected to said image pick-up tube for receiving said image signal to produce a reference pulse representative of said beginning point of the scan line when the leading portion of said image signal exceeds a predetermined level, a third flip-flop circuit connected to said first flip-flop circuit and triggered to change its state by one of the outputs from said first flip-flop circuit when said third flip-flop circuit receives through its set pedestal terminal, an AND gate connected to said comparator and to said third flip-flop circuit for passing therethrough said reference pulse when said AND gate simultaneously receives one of the outputs from said third flip-flop circuit and said reference pulse, a fourth flip-flop circuit connected to said comparator and set by the output from said AND gate and reset by said blanking signal, a counter connected to said fourth flip-flop circuit for counting said synchronizing pulses while said counter receives one of the outputs from said fourth flip-flop circuit, and a processor for processing the output from said counter so as to produce said output signal representing spacings from said beginning point of the scan line to bright and dark spots on the scan line.

7. A photodensitometer according to claim 6, in which said processor includes a memory circuit to receive and memorize therein the contents of said counter when said memory circuit is triggered by said one of the outputs from said second flip-flop circuit, and a digital-to-analogue converter for converting the memorized content of said memory circuit into an analogue signal.

8. A photodensitometer according to claim 7, which further comprises recording means for recording said image signal, said reference pulse, said one of the outputs from said second flip-flop circuit, and said analogue signal on a recording medium.

* * * * *